Mar. 27, 1923.
S. M. FAIRCHILD.
SPEEDOMETER FOR AIRCRAFT.
FILED MAY 8, 1919.
1,449,387.
3 SHEETS—SHEET 2.
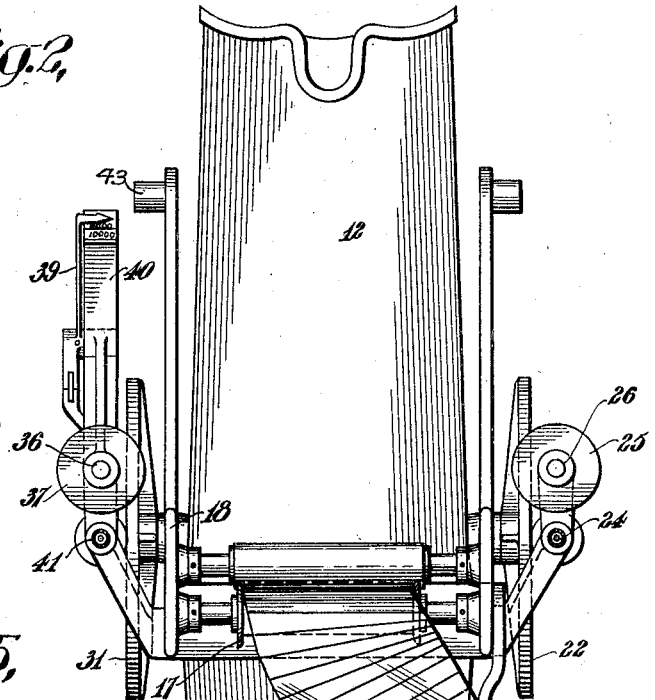
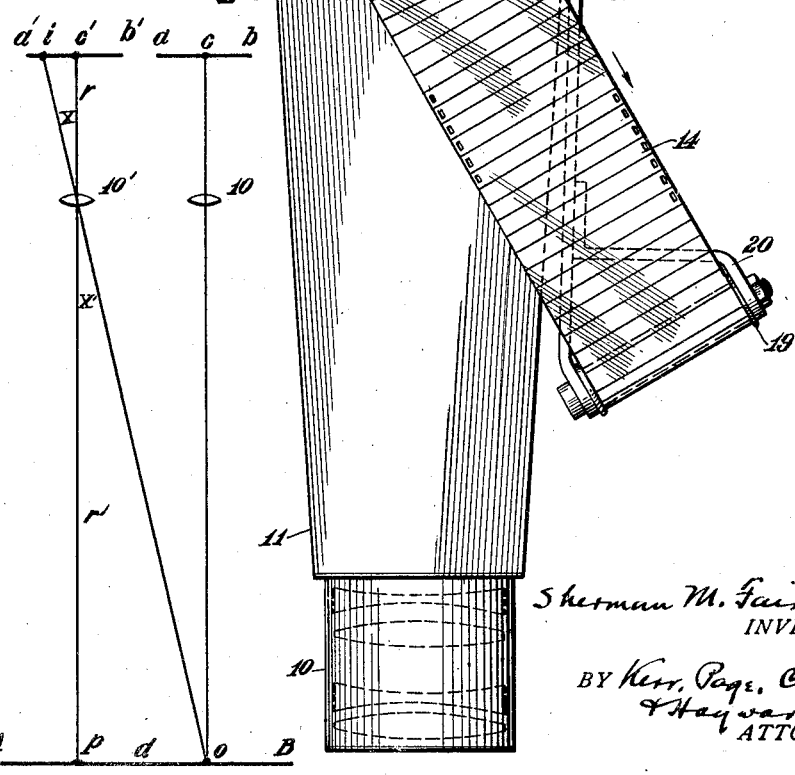
Sherman M. Fairchild
INVENTOR.
BY Kerr, Page, Cooper
& Hayward
ATTORNEYS.

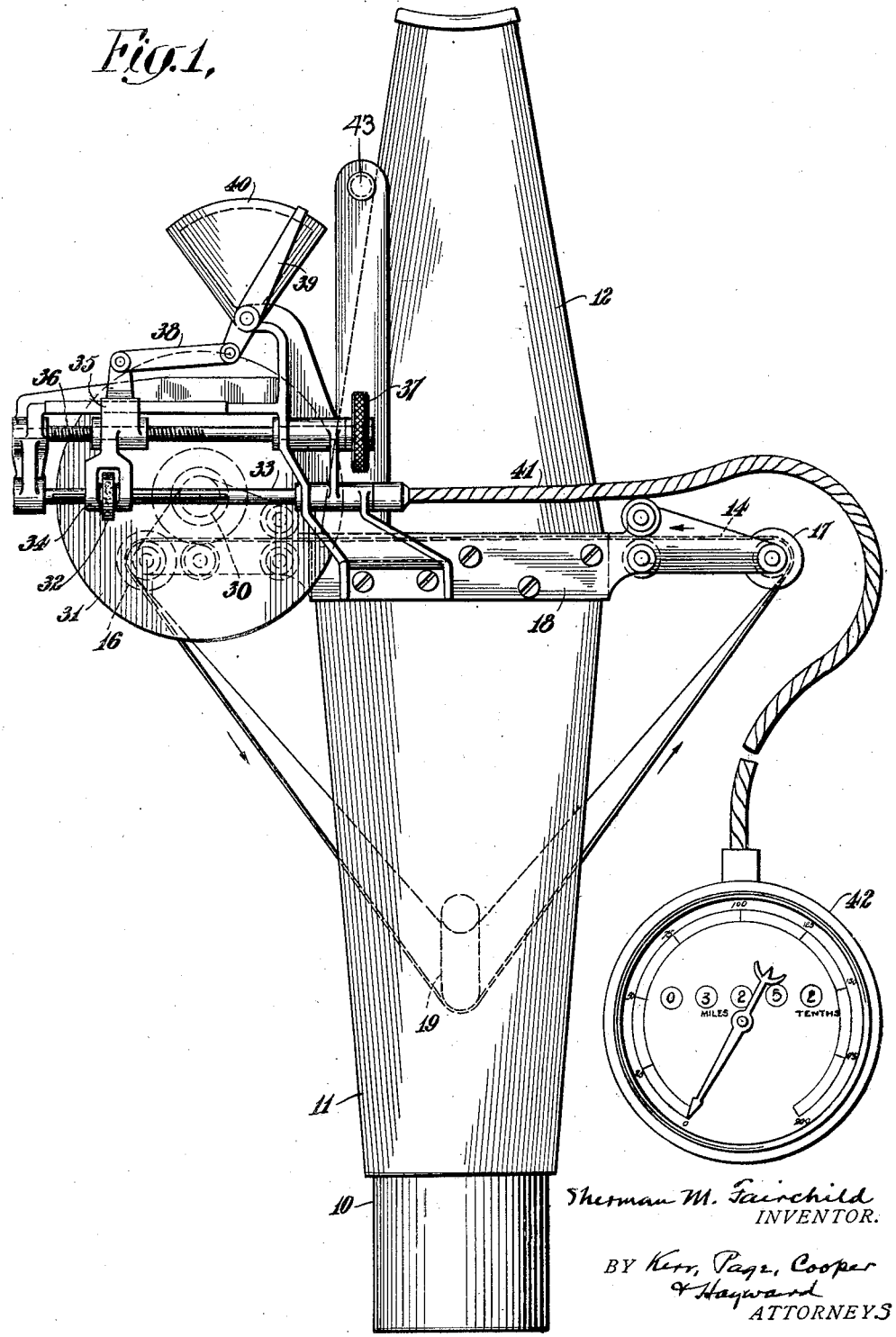

Mar. 27, 1923.

S. M. FAIRCHILD.
SPEEDOMETER FOR AIRCRAFT.
FILED MAY 8, 1919.

Sherman M. Fairchild
INVENTOR.

BY Kerr, Page, Cooper
& Hayward
ATTORNEYS.

Patented Mar. 27, 1923.

1,449,387

UNITED STATES PATENT OFFICE.

SHERMAN M. FAIRCHILD, OF ONEONTA, NEW YORK.

SPEEDOMETER FOR AIRCRAFT.

Application filed May 3, 1919. Serial No. 295,768.

*To all whom it may concern:*

Be it known that I, SHERMAN M. FAIRCHILD, residing at Oneonta, county of Otsego, State of New York, have invented certain new and useful Improvements in Speedometers for Aircraft, of which the following is a full, clear, and exact description.

This invention relates to speed-indicating devices or "speedometers" for airplanes and other aircraft, and its object is to provide a device of automatic or semi-automatic character by which the speed of travel will be indicated without requiring calculation by the observer. To this and other ends the invention consists in the novel features and combinations hereinafter described.

In carrying out the invention I make use of an optical image (either real or virtual) of the ground over which the flyer is travelling. This image moves over the field of the projecting lens or lenses in the same direction as the travel of the airplane and at a speed which (with a projecting lens of given focal length) is a function of the speed of the airplane and its altitude. According to the present invention the speed of the image is combined, by manual adjustment or automatically by connection with the altimeter, with the altitude at which the airplane is flying, to operate or control an indicating device by which the speed of the airplane is shown directly.

One form of the invention is illustrated in the accompanying drawings, in which—

Fig. 1 is a side view of the apparatus.

Fig. 2 is a rear view.

Fig. 5 is a diagram illustrating the optical principles involved.

Figure 3:
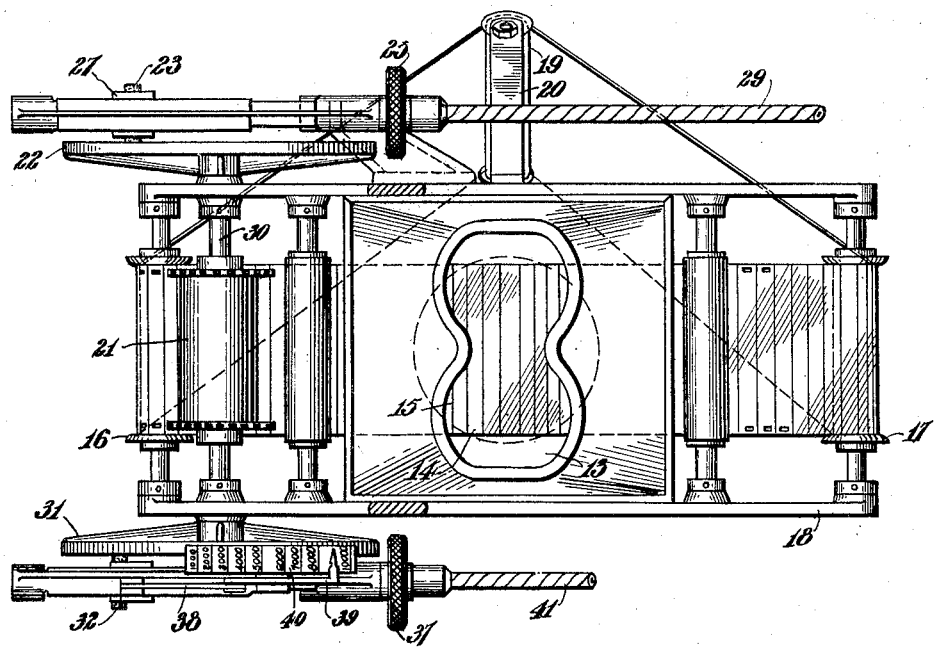
Fig. 3 is a plan view.
Figure 4:
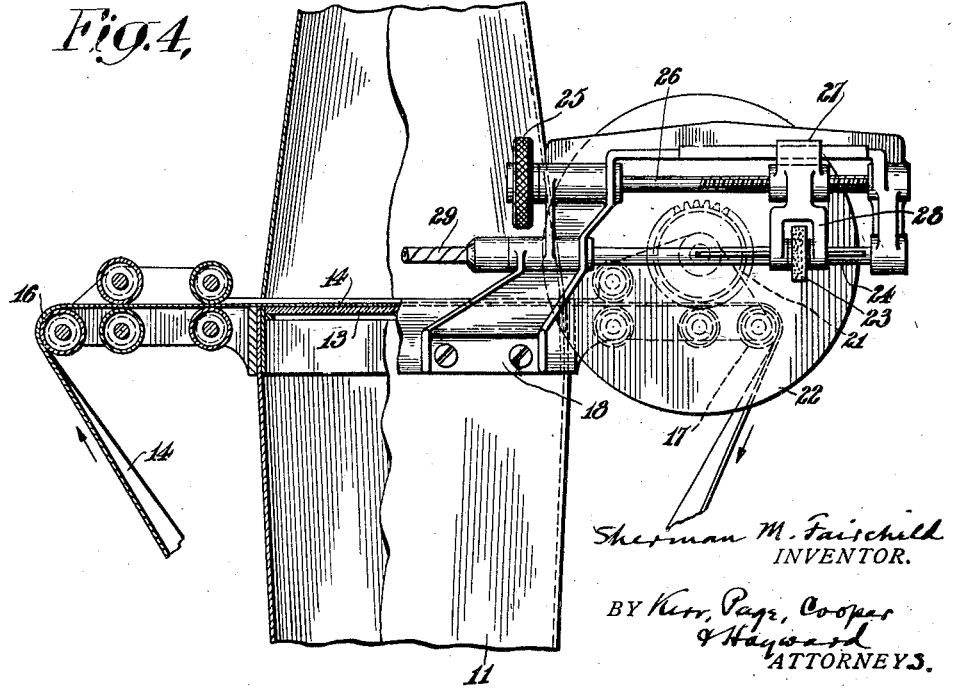
Fig. 4 is a detail side view, partly in section, from the right of Fig. 2.

The projecting lens 10, preferably a lens of long focus or one of the telephoto type so as to produce an image which is relatively large and as fast moving as possible, is mounted in the lower end of a downwardly extending chamber 11 and projects the image into a position where it can be conveniently seen by an observer looking down into the hood 12. Preferably the image is viewed upon a suitable screen, as for example the horizontal ground glass 13, or, if desired the celluloid band 14, described below, may be ground or "frosted" to serve as a screen. Focussing means, not shown, may be provided for the lens, if desired, but at the minimum height at which an airplane usually flies a lens of even long focal length is in "universal focus" if set for sharp focus on an object a few hundred feet distant, and hence focussing means would in most cases be used merely to adjust the lens to a permanent position.

The transparent endless band 14 is composed preferably of celluloid, and is provided with a series of transverse lines 15, Fig. 3. The band travels in the focal plane (or parallel and as near thereto as practicable) over rollers 16, 17, journalled at the ends of the frame 18 in which the chamber 11 and hood are supported, and over a third roller 19 journalled in the bracket 20. It is driven by a sprocket 21, which is itself rotated by a friction disk 22 receiving motion from a friction wheel 23. The latter is feathered on the shaft 24 parallel to a diameter of disk. The driving wheel 23 can be moved across the disk to vary the speed of the latter (and hence the speed of the comparison band 14) by turning by means of the knurled head 25 the endless screw 26, which in turn shifts the nut 27 provided with a fork 28 embracing the wheel. The shaft 24 is driven by a flexible shaft 29 connected to any suitable motor, not shown.

From the foregoing it will be seen that the shaft 30 is rotated at a rate proportional to the speed of the image, and may therefore be used to actuate or control any mechanism or device which should operate or have its operation determined by some definite relation to the image speed, as for example in an aerial camera, the mechanism which passes the film through the field of the lens. Preferably, however, it is utilized to actuate a speedometer, say in the following manner.

At the other end of shaft 30, on which the sprocket 21 and driven friction disk 22 are fixed, is a friction driving disk 31, cooperating with a driven friction wheel 32 feathered on a shaft 33 parallel to a diameter of the disk and adapted to be shifted along said shaft, to vary the speed of the latter, by a fork 34, nut 35, endless screw 36 and knurled head 37. The nut is connected by a link 38 to a pivoted index 39 arranged to traverse an arc-shaped scale 40. The latter is graduated, as indicated in Fig. 3, to correspond to the altitude, in suitable units, for example feet. The shaft 33 is connected by a flexible shaft 41 to a speedometer and odometer 42, of any suitable construction.

The operation of the device is as follows: The observer, looking down into the hood 12, sees the advancing image of the ground over which he is flying, and sees also the black lines of the comparison band 14 travelling in the same direction across the field. Grasping the button 25 he turns the screw 26 backward or forward until the band is seen to be moving at the same speed as the image. He then turns the screw 36, by means of the button 37, to bring the pointer 39 to the graduation corresponding to the altitude at which he is flying, as determined by the altimeter, not shown. The speed of the airplane is then indicated directly by the speedometer 42.

As stated at the outset, the speed of the image projected by the lens depends upon two variables, namely, the speed and the altitude of the airplane; and it will be seen that the apparatus described takes account first of the speed of the image by causing the shaft 30 to rotate at a rate proportional thereto, and then through the medium of the driving disk 31 and adjustable driven wheel 32 corrects this rate according to the altitude. In other words, the device analyzes the speed of the image and translates it into the speed of the plane.

Referring now to Fig. 5, the line A—B represents the ground over which the airplane is flying in a parallel direction. $a$—$b$ represents the field of the lens 10. At a given instant it is perpendicularly over an object $o$ and the image of the latter is formed at the center $c$ of the field. Assume that in a unit of time the airplane travels a distance $d$. The field of the lens is now at $a'$—$b'$, and its center $c'$ is perpendicularly above a point $p$. Therefore $po = d =$ the speed of the airplane. Evidently, however, the image of object $o$ is no longer at the center of the field but has advanced to $i$, the intersection with $a'$—$b'$ of a line drawn from $o$ through the lens, now at $10'$. $c'i$ is therefore the speed of the image. Now $c'i = r \tan x$, in which $r$ is the distance from the lens $10'$ to the field $a'b'$ and $x$ is the angle $c'10'$. But $\tan x = \tan x' = d/r'$, in which $r'$ is the altitude of the airplane. Hence $c'i = rd/r'$. It will therefore be seen that the speed of the image through the field of the lens varies directly as the speed of the airplane and inversely as its altitude. The graduation of the scale 40 can now be easily effected. For example, for an airplane speed of 25 miles per hour at an altitude of 1000 feet, the image speed is obtained by evaluating the formula $c'i = rd/r'$. The value thus obtained is the linear velocity of the comparison band 14 when the latter is travelling in unison with the image. Knowing the rate at which the wheel 32 must rotate to indicate 25 miles per hour on the speedometer, and knowing the radius of the wheel, its position on the disk 31 at which it will rotate at the rate mentioned is easily determined. Shifting the wheel to this position by means of the screw 36, a mark is made on the arc 40 to indicate the corresponding position of the index 39. In like manner the positions of the index for other values of $r'$ can be found. If desired these results can be readily checked by flying at a known speed and altitude above a level plain. Adjusting the wheel 23 by means of the screw 26 until the band is travelling at the same speed as the image, the observer, looking at the speedometer, adjusts the wheel 32 until the speedometer registers the known speed. The pointer 39 should then stand at point marked for the known altitude.

It is desirable to have the field of the lens horizontal in the fore-and-aft direction, and for this purpose the device may be hung in gimbals. It is usually sufficient, however, to support the device on transverse pivots, as 43, Figs. 1 and 2, resting in suitable bearings not shown.

It is to be understood that the invention is not limited to the specific construction herein illustrated and described but can be embodied in other forms without departure from its spirit as defined by the following claims.

I claim:

1. In a device for use on aircraft, in combination, optical means for producing an image of objects over which the aircraft is travelling, mechanism including a rotatable member adapted to be driven at a rate proportional to the rate of movement of the image, and means adapted to be continuously driven by said mechanism according to the altitude of the aircraft for translating the rate of rotation of said rotatable member into speed of the aircraft.

2. In a device for use on aircraft, in combination, optical means for producing an image of objects over which the aircraft is travelling, a comparison member having a mark adapted to be moved in unison with the image, and means, including an indicating device having a rotary driving shaft, cooperating with said member and adapted to be driven at a rate determined by the speed of said member and the altitude of the aircraft, for translating the speed of the image into the speed of the aircraft.

3. In a device for use on aircraft, in combination, optical means for producing an image of objects over which the aircraft is traveling; mechanism, including a rotatable member, adapted to be driven at a rate proportional to the rate of movement of the image; speed-indicating mechanism; and speed-varying mechanism connecting said rotatable member with the speed-indicating mechanism to actuate the latter and adjustable in accordance with the altitude of the aircraft, to translate the speed of the image into actual speed of the aircraft.

4. In a device for use on aircraft, in combination, optical means for producing an image of objects over which the aircraft is travelling, mechanism adapted to be driven at a rate proportional to the speed of the image, means for correcting the rate of said mechanism according to the altitude of the aircraft, and a speed-indicator connected with the last mentioned means for actuation at the corrected rate.

5. In a device for use on aircraft, in combination, optical means for producing an image of objects over which the aircraft is travelling, a comparison member having a mark adapted to be moved in unison with the image, a speed indicator, and means co-operating with the speed indicator and with the comparison member to correct the rate of movement of the comparison member according to the altitude of the aircraft and drive the indicator at the corrected rate.

6. In a device for use on aircraft, in combination, optical means for producing an image of objects over which the aircraft is travelling, a comparison member having a plurality of marks and adapted to travel through the field of the optical means for comparison with the image, mechanism for actuating the comparison member and adjustable in rate to drive the comparison member at a speed directly proportional to the speed of the image, mechanism driven by said actuating mechanism and adjustable so as to be driven at a rate directly proportional to the altitude of the aircraft, and a speedometer actuated by the latter mechanism.

7. In a device for use on aircraft, in combination, optical means for producing an image of objects over which the aircraft is travelling, mechanism adapted to be driven at a rate proportional to the rate of movement of the image, a friction disk driven by said mechanism, a friction wheel driven by the friction disk and adjustable across the same so as to be driven thereby at a rate directly proportional to the altitude of the aircraft, and a speedometer connected with said wheel to translate its rate of rotation into speed of the aircraft.

8. In a device for use on aircraft, in combination, optical means for producing an image of objects over which the aircraft is travelling; a comparison member movable through the field of said optical means; means, including a rotary shaft, for moving said comparison member; a friction disk connected with the shaft to rotate the same; a friction driving wheel adjustable across the disk to rotate the latter and the shaft at a rate at which the comparison member is caused to travel in unison with the image; a friction disk connected with the shaft for rotation thereby; a friction wheel adjustable across the last-named disk for rotation thereby at a variable speed according to the altitude of the aircraft; and a speedometer connected with the last-named wheel to translate the latter's rate of rotation into speed of the aircraft.

9. In a device for use on aircraft, in combination, optical means for producing an image of objects over which the aircraft is travelling; an endless comparison band movable through the field of the optical means and having driving perforations; a sprocket cooperating with the perforations to drive the band; a shaft for driving the sprocket; a friction disk on the shaft to rotate the latter; a friction driving wheel adjustable across the disk to rotate the same and the shaft at a variable rate; a friction disk on the shaft for rotation thereby; a friction wheel adjustable across the latter disk for rotation thereby at a variable rate; and a speedometer connected with the latter wheel.

10. In a device for use on aircraft, in combination, a lens stationary relatively to the aircraft for projecting a moving image of objects over which the aircraft is flying, a traveling comparison member, manually controlled mechanism, including a rotating shaft, for driving the comparison member at a speed directly proportional to the speed of the image, a second rotating shaft, a speedometer driven by the latter, and manually adjustable means connecting the two shafts to drive the second from the first at a speed directly proportional to the speed of the aircraft.

In testimony whereof I hereunto affix my signature.

SHERMAN M. FAIRCHILD.